(12) United States Patent
Tang et al.

(10) Patent No.: US 11,290,653 B1
(45) Date of Patent: Mar. 29, 2022

(54) METHOD FOR CONTROLLING OPTICAL SENSING CIRCUIT, OPTICAL SENSING CIRCUIT, AND IMAGING DEVICE

(71) Applicant: Shenzhen Reolink Technology Co., Ltd., Shenzhen (CN)

(72) Inventors: Lei Tang, Shenzhen (CN); Yulong Que, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/469,923

(22) Filed: Sep. 9, 2021

(51) Int. Cl.
*H04N 5/235* (2006.01)
*H05B 47/14* (2020.01)
*G01J 1/44* (2006.01)

(52) U.S. Cl.
CPC .............. *H04N 5/2351* (2013.01); *G01J 1/44* (2013.01); *H04N 5/2354* (2013.01); *H05B 47/14* (2020.01)

(58) Field of Classification Search
CPC .... H04N 5/2351; H04N 5/2354; H05B 47/14; G01J 1/44
See application file for complete search history.

(56) References Cited

FOREIGN PATENT DOCUMENTS

JP 2014072065 A * 4/2014 ............. H05B 37/02

* cited by examiner

*Primary Examiner* — Jamil Ahmed
(74) *Attorney, Agent, or Firm* — Idea Intellectual Limited; Margaret A. Burke; Sam T. Yip

(57) ABSTRACT

This application discloses a method for controlling an optical sensing circuit, an optical sensing circuit, and an imaging device. The optical sensing circuit includes an optical sensor and a voltage dividing circuit connected in series, an input voltage (a voltage of the voltage dividing circuit) and an output voltage are obtained, a resistance value of the optical sensor is calculated according to the input voltage, a light intensity value is obtained according to the resistance value of the optical sensor, and then, different loads are controlled based on a level of the output voltage for light intensity in different ranges to perform corresponding operations. This application has high flexibility and strong adaptability, and can effectively broaden an application scope of a photosensitive device.

16 Claims, 3 Drawing Sheets

METHOD FOR CONTROLLING OPTICAL SENSING CIRCUIT, OPTICAL SENSING CIRCUIT, AND IMAGING DEVICE

CROSS-REFERENCE TO RELATED APPLICATION

The present application claims priority from the Chinese Invention Patent Application No. 202110550251.7 filed on May 19, 2021, and the disclosure of which is incorporated herein by reference in its entirety.

FIELD OF THE INVENTION

This application relates to the field of sensing technologies, and specifically, to a method for controlling an optical sensing circuit, an optical sensing circuit, and an imaging device.

BACKGROUND OF THE INVENTION

A characteristic of most photosensitive devices, for example, a visible light sensor used in a camera, is that a resistance value varies with light intensity. For a camera, a resistance value of an optical sensor varies with light intensity almost at a linear ratio. In a case that a supply voltage is constant, light intensity in a large range cannot be distinguished by using a simple control circuit and a simple control method.

SUMMARY OF THE INVENTION

Based on this, embodiments of this application provide a method for controlling an optical sensing circuit, an optical sensing circuit, and an imaging device, to control, based on a level of an output voltage, different loads for light intensity in different ranges.

According to a first aspect, this application provides a method for controlling an optical sensing circuit, where the optical sensing circuit includes an optical sensor and a voltage dividing circuit connected in series, and the control method includes:

obtaining an input voltage and an output voltage, where the input voltage is a voltage of the voltage dividing circuit;

calculating a resistance value of the optical sensor according to the input voltage; obtaining a light intensity value according to the resistance value of the optical sensor; and controlling, based on a level of the output voltage, a load according to the input voltage to perform a corresponding operation.

Optionally, the calculating a resistance value of the optical sensor according to the input voltage includes:

calculating a voltage of the optical sensor according to the input voltage;

calculating a series current according to the input voltage; and calculating the resistance value of the optical sensor according to the voltage of the optical sensor and the series current.

Optionally, a manner of obtaining the light intensity value is:

searching a mapping table according to the resistance value of the optical sensor, to obtain a corresponding light intensity value.

Optionally, the controlling, based on a level of the output voltage, a load according to the input voltage to perform a corresponding operation includes:

determining a magnitude of the input voltage if the output voltage is at a low level;

controlling, if the input voltage is greater than or equal to a first threshold, the load to turn on;

controlling, if the input voltage is less than or equal to a second threshold, the load to turn off; and skipping processing (i.e., allowing the load to continue to operate at a current state) if the input voltage is less than the first threshold and is greater than the second threshold; and after the controlling a load to perform a corresponding operation, the method further includes:

adjusting the level of the output voltage.

Optionally, the load includes an infrared lamp.

Optionally, the controlling, based on a level of the output voltage, a load according to the input voltage to perform a corresponding operation further includes:

determining a magnitude of the input voltage if the output voltage is at a high level; and configuring a parameter of the load according to the light intensity value if the input voltage is less than or equal to a third threshold; and after the controlling a load to perform a corresponding operation, the method further includes:

adjusting the level of the output voltage.

Optionally, the load includes an image sensor.

According to a second aspect, an embodiment of this application provides an optical sensing circuit, including an optical sensor and a voltage dividing circuit connected in series, and further including a master control circuit, where the optical sensor and the voltage dividing circuit are both connected to the master control circuit, and the master control circuit is configured to perform steps of the method for controlling an optical sensing circuit according to the first aspect.

Optionally, the voltage dividing circuit includes a first resistor, a second resistor, and a first metal oxide semiconductor (MOS) transistor, one end of the first resistor is respectively connected to one end of the optical sensor and an input interface of the master control circuit, another end of the first resistor is grounded, one end of the second resistor is respectively connected to the one end of the optical sensor and the input interface of the master control circuit, another end of the second resistor is connected to a drain of the first MOS transistor, a gate of the first MOS transistor is connected to an output interface of the master control circuit, a source of the first MOS transistor is grounded, and another end of the optical sensor is connected to an internal power supply.

According to a third aspect, an embodiment of this application provides an imaging device, including an optical sensing circuit, a memory, and a processor, where the memory stores a program, and the program, when executed by the processor, performs steps of the method for controlling an optical sensing circuit according to the first aspect.

In the method for controlling an optical sensing circuit of this application, where the optical sensing circuit includes an optical sensor and a voltage dividing circuit connected in series, an input voltage (a voltage of the voltage dividing circuit) and an output voltage are obtained, a resistance value of the optical sensor is calculated according to the input voltage, a light intensity value is obtained according to the resistance value of the optical sensor, and then, different loads are controlled based on a level of the output voltage for light intensity in different ranges to perform corresponding operations. This application has high flexibility and strong adaptability, and can effectively broaden an application scope of a photosensitive device.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person skilled in the art may still derive other drawings from these accompanying drawings without creative efforts.

DETAILED DESCRIPTION

To clearly states the objectives, technical solutions, and advantages of this application, the technical solutions of this application will be clearly and completely described below with reference to embodiments and drawings. Apparently, the described embodiments are merely some rather than all of the embodiments. The following embodiments and features in the embodiments may be mutually combined if no conflict occurs.

A characteristic of most photosensitive devices, for example, a visible light sensor used in a camera, is that a resistance value varies with light intensity. For a camera, a resistance value of an optical sensor varies with light intensity almost at a linear ratio. In a case that a supply voltage is constant, light intensity in a large range cannot be distinguished by using a simple control circuit and a simple control method. Therefore, a light intensity value may be obtained through conversion by reading a voltage of a voltage dividing resistor connected in series with the optical sensor. The optical sensor mainly has two purposes: a first purpose is to turn on or turn off some loads (such as an infrared lamp of the camera) according to the light intensity value, for this purpose, a light intensity range generally needing to be distinguished is 0 lux to 10 lux range, and the range is set as a range A due to a requirement for high distinguishing accuracy of light intensity; and a second aspect purpose is to distinguish different brightness scenes in a daytime environment and configure a parameter of a load (such as an image sensor of the camera) according to the light intensity value, to prevent the first frame image after the camera is turned on to record a video from being too bright or too dark, mainly for distinguishing light intensity in a range of 100 lux to 5000 lux, where the range is set as a range B. In other words, the light intensity range of 0 lux to 10 lux needs to be identified for determining whether to turn on the infrared lamp, and the light intensity range of 100 lux to 5000 lux needs to be distinguished well in a daytime environment.

Based on the foregoing descriptions, in this application, an input voltage (a voltage of the voltage dividing circuit) and an output voltage are obtained, a resistance value of the optical sensor is calculated according to the input voltage, a light intensity value is obtained according to the resistance value of the optical sensor, and then, different loads are controlled based on a level of the output voltage for light intensity in different ranges to perform corresponding operations. This application has high flexibility and strong adaptability, can effectively broaden an application scope of a photosensitive device, and can also ensure normal light-filling by an infrared lamp of a camera and normal image-taking by an image sensor.

Figure 1:
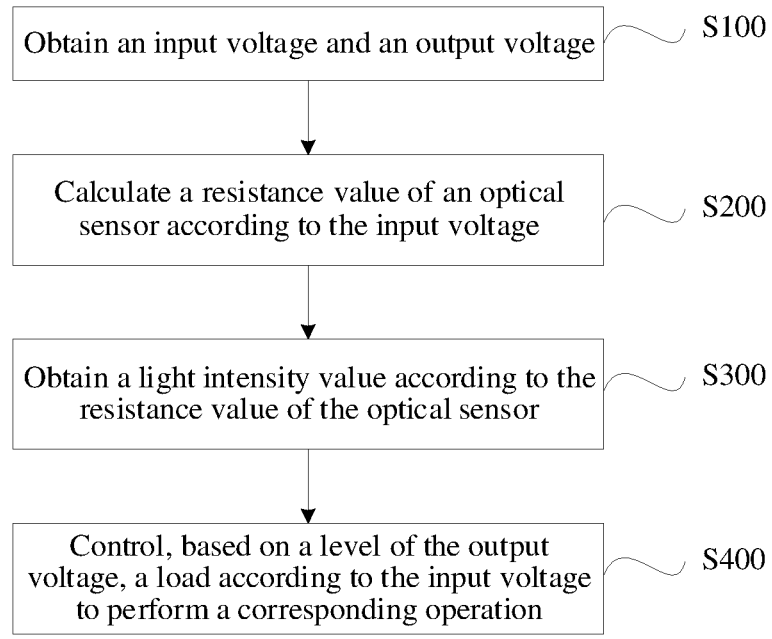
FIG. 1 is a schematic flowchart of a method for controlling an optical sensing circuit according to a first embodiment of this application.

According to a first aspect, an embodiment of this application provides a method for controlling an optical sensing circuit. The optical sensing circuit includes an optical sensor and a voltage dividing circuit connected in series. As shown in FIG. 1, the method includes:

Step S100: Obtain an input voltage and an output voltage, where the input voltage is a voltage of the voltage dividing circuit.

Step S200: Calculate a resistance value of the optical sensor according to the input voltage.

Step S300: Obtain a light intensity value according to the resistance value of the optical sensor.

Step S400: Control, based on a level of the output voltage, a load according to the input voltage to perform a corresponding operation.

Figure 2:
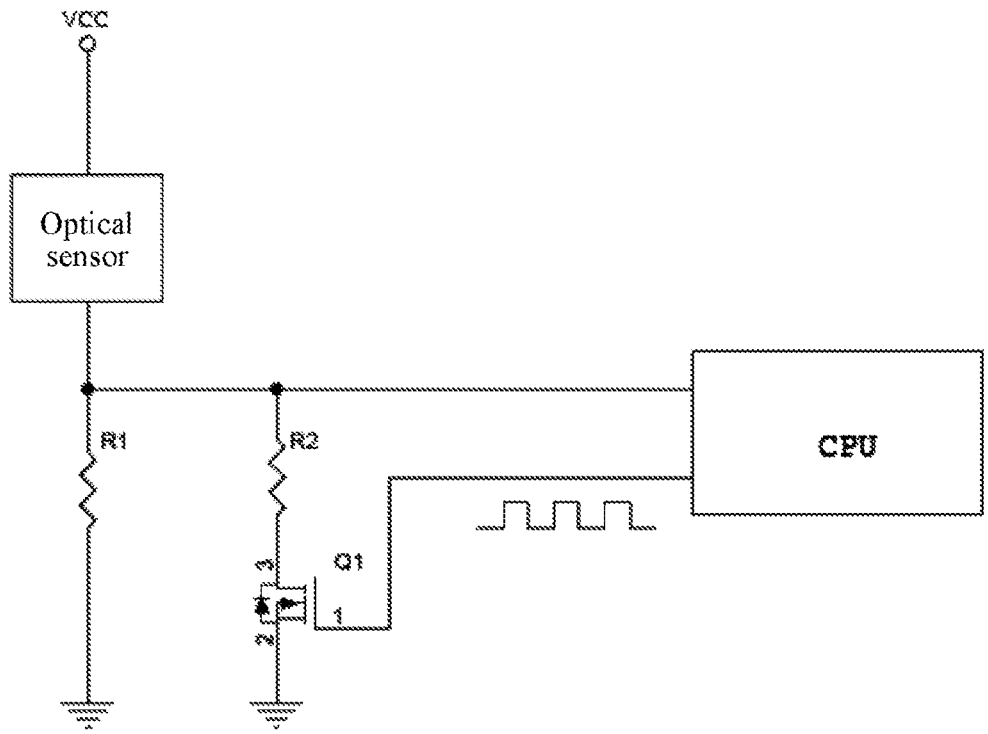
FIG. 2 is a schematic circuit diagram of an optical sensing circuit according to an embodiment of this application.

In some embodiments, FIG. 2 is a schematic circuit diagram of an optical sensing circuit included in this embodiment. A central processing unit (CPU), includes two interfaces: an ADC interface (an input interface) and a GPIO1 interface (an output interface). The ADC interface is configured to read a voltage of the optical sensor, and the GPIO1 interface is configured to output a high or low level to control on or off of a first MOS transistor Q1, to achieve impedance matching. The ADC interface is respectively connected to one end of a first resistor R1 and one end of a second resistor R2, another end of the second resistor R2 is connected to a drain of the first MOS transistor Q1, a source of the first MOS transistor Q1 is grounded, and a gate of the first MOS transistor Q1 is connected to the GPIO1 interface. The one end of the first resistor R1 is connected to an internal power supply VCC by the optical sensor, and another end of the first resistor R1 is grounded. The second resistor R2 is connected in series to the first MOS transistor Q1 and then is connected in parallel to the first resistor R1, to form the voltage dividing circuit. The voltage dividing circuit is connected in series to the optical sensor. The optical sensing circuit may be applied to a camera or another device related to optical sensing technologies.

In some embodiments, the control method of this embodiment is applied to the foregoing CPU. The CPU obtains the input voltage (the voltage of the voltage dividing circuit) through the ADC interface, obtains the output voltage through the GPIO1 interface, calculates the resistance value of the optical sensor according to the input voltage, and obtains the light intensity value according to the resistance value of the optical sensor.

In some embodiments, when the GPIO1 interface outputs a low level, the first MOS transistor Q1 is cut off, the second resistor R2 is disconnected, and the light intensity is switched from the range B to the range A. When the GPIO1 interface outputs a high level, the first MOS transistor Q1 is switched on, the first resistor R1 is connected in parallel to the second resistor R2, and the light intensity is switched from the range A to the range B. Therefore, different loads may be controlled based on the level of the output voltage of the GPIO1 interface for light intensity in different ranges to perform corresponding operations. This application has high flexibility and strong adaptability, and can effectively broaden an application scope of a photosensitive device. If the optical sensing circuit and the method for controlling the same are applied to the camera, normal light-filling by an infrared lamp of the camera and normal image-taking by an image sensor can further be ensured, and a specific implementation process is described in the following embodiments in detail.

Figure 3:
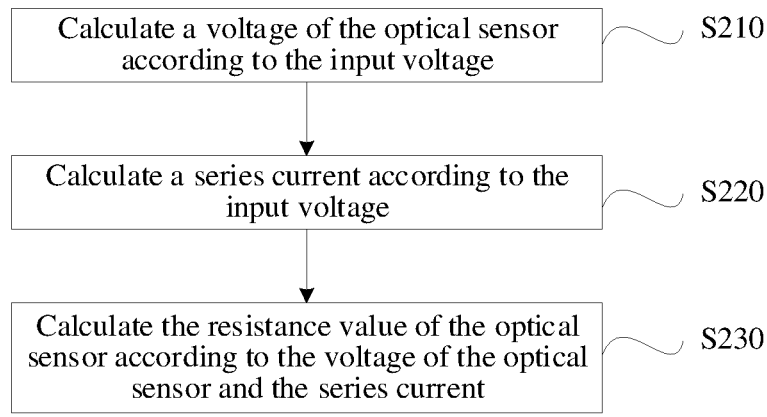
FIG. 3 is a schematic flowchart of a method for controlling an optical sensing circuit according to a second embodiment of this application.

In some embodiments, as shown in FIG. 3, step S200 includes:

Step S210: Calculate a voltage of the optical sensor according to the input voltage.

Step S220: Calculate a series current according to the input voltage.

Step S230: Calculate the resistance value of the optical sensor according to the voltage of the optical sensor and the series current.

In some embodiments, referring to FIG. 2, because the voltage dividing circuit is connected in series to the optical sensor, the voltage on the optical sensor can be calculated according to a difference between a voltage of the power supply VCC and an input voltage of the ADC interface. Further, the series current can be calculated according to the input voltage of the ADC interface and a parallel resistance of the first resistor R1 and the second resistor R2. Moreover, a ratio of the voltage on the optical sensor to the series current is calculated, that is, the resistance value of the optical sensor is calculated.

In some embodiments, in step S300, a manner of obtaining the light intensity value is:

searching a mapping table according to the resistance value of the optical sensor, to obtain a corresponding light intensity value.

In some embodiments, each type or model of optical sensor has a mapping table of resistance values and light intensity values. The mapping table is stored in the CPU, and the CPU can obtain a corresponding light intensity value by searching the mapping table according to the calculated resistance value of the optical sensor.

Figure 4:
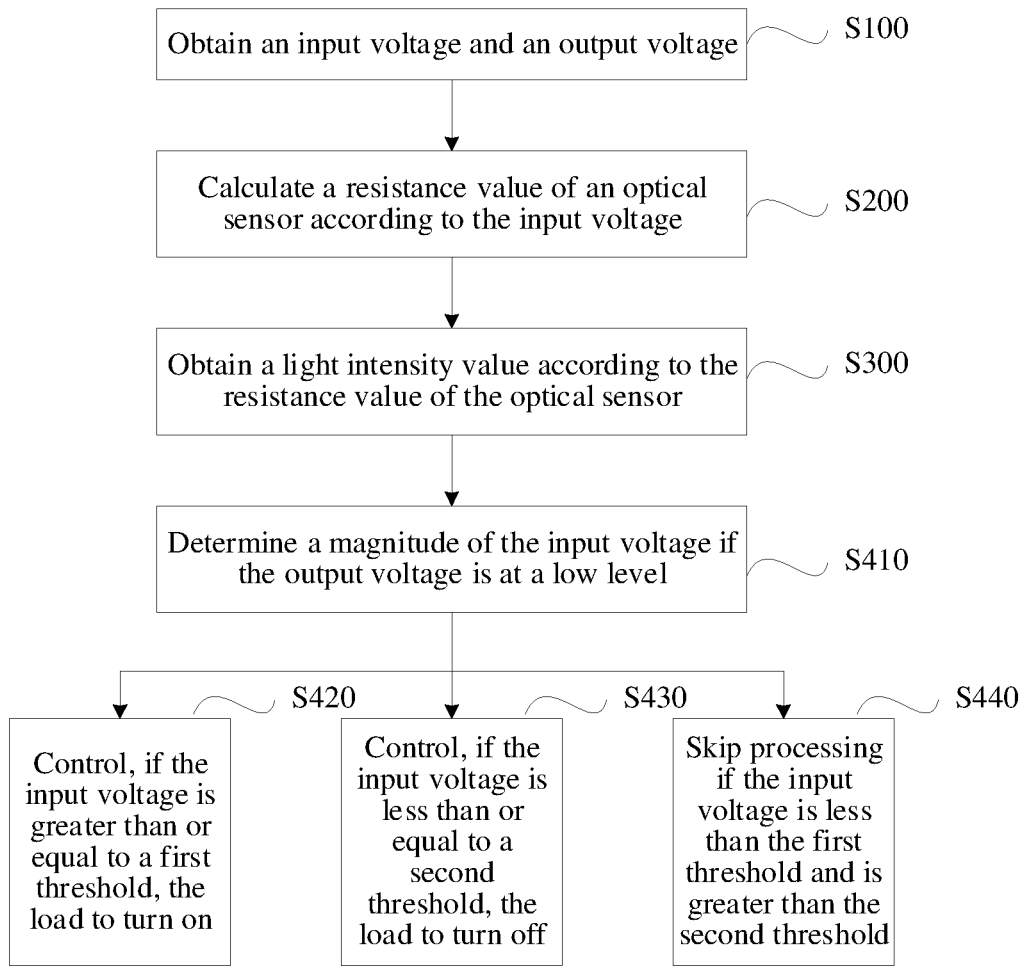
FIG. 4 is a schematic flowchart of a method for controlling an optical sensing circuit according to a third embodiment of this application.

In some embodiments, as shown in FIG. 4, step S400 includes:

Step S410: Determine a magnitude of the input voltage if the output voltage is at a low level.

Step S420: Control, if the input voltage is greater than or equal to a first threshold, the load to turn on.

Step S430: Control, if the input voltage is less than or equal to a second threshold, the load to turn off.

Step S440: Skip processing (i.e., allow the load to continue to operate at a current state) if the input voltage is less than the first threshold and is greater than the second threshold.

In some embodiments, the load includes an infrared lamp. In a case that the light intensity value is in the range A, the input voltage obtained by the CPU is approximately Vdrop to VCC, where Vdrop is a saturation voltage drop of the optical sensor. In a case that the light intensity value is in the range B, the input voltage obtained by the CPU is also Vdrop to VCC. In the range A, a voltage specified for enabling light filling of the infrared lamp is a first threshold VCC_H, and a voltage specified for disabling light filling of the infrared lamp is a second threshold VCC_L, where VCC>VCC_H>VCC_L>Vdrop. When the output voltage is at a low level, the light intensity is switched from the range B to the range A. In this case, the voltage is compared with the two thresholds VCC_H and VCC_L in the range A. If the input voltage is less than the first threshold VCC_H and is greater than the second threshold VCC_L, the CPU skips processing. If the input voltage is greater than or equal to the first threshold VCC_H, the infrared lamp is controlled to turn on to perform light filling. If the input voltage is less than or equal to the second threshold VCC_L, the infrared lamp is controlled to turn off.

In some embodiments, it may be understood that, there is a voltage difference between the VCC_H and the VCC_L, and a greater voltage difference indicates a broader debounce range for turning on and turning off the infrared lamp, thereby preventing the infrared lamp from being repeatedly switched, and prolonging the service life of the infrared lamp.

Figure 5:
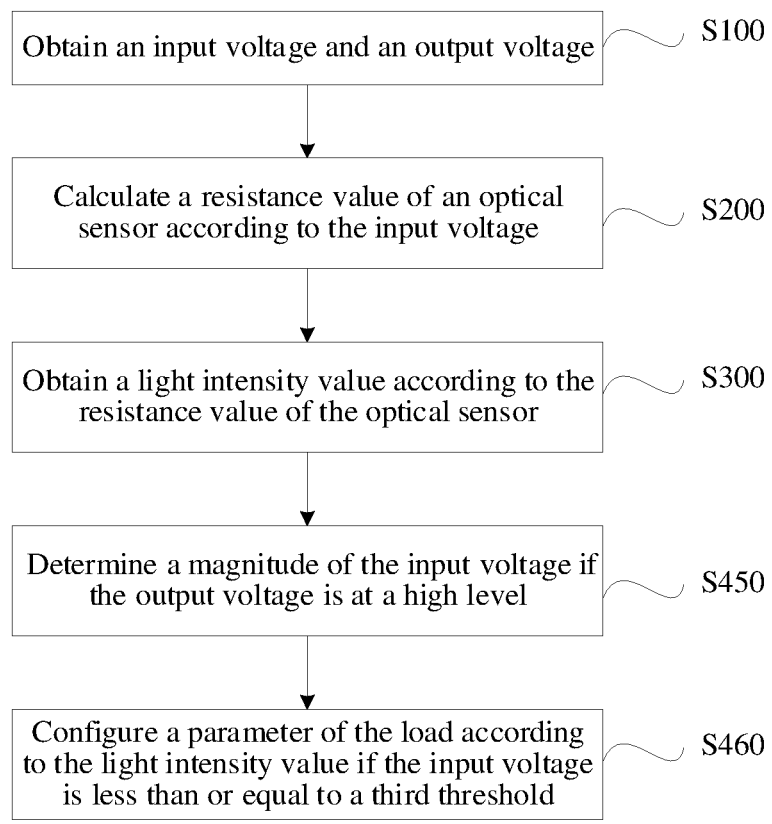
FIG. 5 is a schematic flowchart of a method for controlling an optical sensing circuit according to a fourth embodiment of this application.

In some embodiments, as shown in FIG. 5, step S400 includes:

Step S450: Determine a magnitude of the input voltage if the output voltage is at a high level.

Step S460: Configure a parameter of the load according to the light intensity value if the input voltage is less than or equal to a third threshold.

In some embodiments, the load includes an image sensor. In the range B, one threshold is set as a third threshold VCC_HH, where VCC>VCC_HH>Vdrop. When the output voltage is at a high level, the light intensity is switched from the range A to the range B. In this case, the voltage is compared with the threshold VCC_HH in the range B. If the input voltage is less than or equal to the third threshold VCC_HH, the output voltage does not change, and the CPU configures a parameter of the image sensor according to the calculated light intensity value, thereby preventing the first frame image after the camera turns on to record a video from being too bright or too dark.

In some embodiments, after the load is controlled to perform a corresponding operation, the level of the output voltage needs to be continuously adjusted, for reading the voltage of the optical sensor, to further control the load to perform a next operation. For example, when the input voltage is less than or equal to the second threshold VCC_L, after the infrared lamp is controlled to turn off, in this case, the level of the output voltage still needs to be continuously adjusted until the input voltage is no longer less than or equal to the second threshold VCC_L, to detect, in real time, whether the infrared lamp needs to turn on again, and ensure normal operation of the infrared lamp. In another example, if the input voltage is greater than the third threshold VCC_HH, the level of the output voltage needs to be continuously adjusted until the input voltage is no longer greater than the third threshold VCC_HH, to detect, in real time, whether the image sensor needs to be configured.

With reference to the foregoing embodiments, in the method for controlling an optical sensing circuit of this application, an ambient light intensity value is obtained through conversion by using a reading of a voltage dividing resistor connected in series, and a processor of the camera performs two operations by using the ambient light intensity value: first, turning on or turning off the infrared lamp according to the ambient light intensity value; and second, configuring a parameter of the image sensor in a daytime environment, to prevent the first frame image photographed by the camera from being too bright or too dark after the camera is awakened.

According to a second aspect, an embodiment of this application provides an optical sensing circuit, including an optical sensor and a voltage dividing circuit connected in series, and further including a master control circuit, where the optical sensor and the voltage dividing circuit are both connected to the master control circuit, and the master control circuit is configured to perform steps of the method for controlling an optical sensing circuit according to the first aspect.

In some embodiments, for an operation process and an implementation principle of the optical sensing circuit, refer to descriptions of the first aspect. Details are not described herein again.

According to a third aspect, an embodiment of this application provides an imaging device, including an optical sensing circuit, a memory, and a processor, where the memory stores a program, and the program, when executed by the processor, performs steps of the method for controlling an optical sensing circuit according to the first aspect.

In some embodiments, the imaging device may be a camera. Applying the optical sensing circuit and the method for controlling the same to a camera can ensure normal light-filling by an infrared lamp of the camera and normal image-taking by an image sensor. For a specific implementation process, refer to the descriptions of the first aspect. Details are not described herein again.

A person skilled in the art can understand that all or some of the steps, and functional modules/units in the system and device in the method disclosed above may be implemented as software, firmware, hardware, and an appropriate combination thereof.

Although this application has been shown and described relative to one or more implementations, a person skilled in the art may come up with equivalent variations and modifications based on reading and understanding of the specification and the accompanying drawings. This application includes all of the variations and modifications, which are only limited by the scope of the appended claims. Especially, for various functions performed by the foregoing component, the term used to describe the component is intended to indicate any component (unless otherwise specified) that performs a specified function of the component (for example, they are functionally equivalent), even if the structure of the component is not the same as a disclosed structure of this specification that performs the function in the exemplary implementations herein.

In addition, although terms, such as first, second, and third, are used in this specification to describe various information, the information should not be limited to these terms. These terms are merely used to distinguish between information of the same type.

The terms "a", "an", and "the" indicating a singular form that are used in this specification are also intended to include a plural form. The terms "or" and "and/or" are interpreted as inclusive, or mean any one or any combination. Only when combinations of components, functions, steps, or operations are internally and mutually exclusive in some manners, an exception to the definition may occur.

In this application, the word "in some embodiments" is used to represent "giving an example, an illustration, or a description". Any embodiment described as "in some embodiments" in this application should not be explained as being more preferred or having more advantages than another embodiment. The following descriptions are presented by this application to enable a person skilled in the art to implement and use this application. In the foregoing description, any detail is listed for the purpose of explanation. It should be understood that a person skilled in the art can realize that this application can also be implemented when these specific details are not used. In other embodiments, commonly known structures and processes are not described in detail, to prevent unnecessary details from making descriptions of this application obscure. Therefore, this application is not limited to the embodiments shown, but is to be accorded the widest scope consistent with the principles and features disclosed in this application.

What is claimed is:

1. A method for controlling an optical sensing circuit, wherein the optical sensing circuit comprises an optical sensor and a voltage dividing circuit connected in series, the control method comprises:
    obtaining an input voltage and an output voltage, wherein the input voltage is a voltage of the voltage dividing circuit;
    calculating a resistance value of the optical sensor according to the input voltage;
    obtaining a light intensity value according to the resistance value of the optical sensor; and
    controlling, based on a level of the output voltage, a load according to the input voltage to perform a corresponding operation.

2. The method for controlling an optical sensing circuit according to claim 1, wherein the calculating a resistance value of the optical sensor according to the input voltage comprises:
    calculating a voltage of the optical sensor according to the input voltage;
    calculating a series current according to the input voltage; and
    calculating the resistance value of the optical sensor according to the voltage of the optical sensor and the series current.

3. The method for controlling an optical sensing circuit according to claim 1, wherein a manner of obtaining the light intensity value is:
    searching a mapping table according to the resistance value of the optical sensor, to obtain a corresponding light intensity value.

4. The method for controlling an optical sensing circuit according to claim 1, wherein the controlling, based on a level of the output voltage, a load according to the input voltage to perform a corresponding operation comprises:
    determining a magnitude of the input voltage if the output voltage is at a low level;
    controlling, if the input voltage is greater than or equal to a first threshold, the load to turn on;
    controlling, if the input voltage is less than or equal to a second threshold, the load to turn off;
    skipping processing if the input voltage is less than the first threshold and is greater than the second threshold; and
    after the controlling a load to perform a corresponding operation, the method further includes:
    adjusting the level of the output voltage.

5. The method for controlling an optical sensing circuit according to claim 4, wherein the load comprises an infrared lamp.

6. The method for controlling an optical sensing circuit according to claim 1, wherein the controlling, based on a level of the output voltage, a load according to the input voltage to perform a corresponding operation further comprises:
    determining a magnitude of the input voltage if the output voltage is at a high level; and
    configuring a parameter of the load according to the light intensity value if the input voltage is less than or equal to a third threshold; and
    after the controlling a load to perform a corresponding operation, the method further includes:
    adjusting the level of the output voltage.

7. The method for controlling an optical sensing circuit according to claim 6, wherein the load comprises an image sensor.

8. An optical sensing circuit, comprising an optical sensor and a voltage dividing circuit connected in series, and further comprising a master control circuit, wherein the optical sensor and the voltage dividing circuit are both connected to the master control circuit, and the master control circuit is configured to perform steps of the method for controlling an optical sensing circuit according to claim 1.

9. The optical sensing circuit according to claim 8, wherein the voltage dividing circuit comprises a first resistor, a second resistor, and a first metal oxide semiconductor (MOS) transistor, one end of the first resistor is respectively connected to one end of the optical sensor and an input interface of the master control circuit, another end of the first resistor is grounded, one end of the second resistor is respectively connected to the one end of the optical sensor and the input interface of the master control circuit, another end of the second resistor is connected to a drain of the first MOS transistor, a gate of the first MOS transistor is connected to an output interface of the master control circuit, a source of the first MOS transistor is grounded, and another end of the optical sensor is connected to an internal power supply.

10. An imaging device, comprising an optical sensing circuit, a memory, and a processor, where the memory stores a program, and the program, when executed by the processor, performs a method for controlling an optical sensing circuit, the method comprises:
    obtaining an input voltage and an output voltage, wherein the input voltage is a voltage of the voltage dividing circuit;
    calculating a resistance value of the optical sensor according to the input voltage;
    obtaining a light intensity value according to the resistance value of the optical sensor; and
    controlling, based on a level of the output voltage, a load according to the input voltage to perform a corresponding operation.

11. The imaging device according to claim 10, wherein the calculating a resistance value of the optical sensor according to the input voltage comprises:
    calculating a voltage of the optical sensor according to the input voltage;
    calculating a series current according to the input voltage; and
    calculating the resistance value of the optical sensor according to the voltage of the optical sensor and the series current.

12. The imaging device according to claim 10, wherein a manner of obtaining the light intensity value is:
    searching a mapping table according to the resistance value of the optical sensor, to obtain a corresponding light intensity value.

13. The imaging device according to claim 10, wherein the controlling, based on a level of the output voltage, a load according to the input voltage to perform a corresponding operation comprises:
    determining a magnitude of the input voltage if the output voltage is at a low level;
    controlling, if the input voltage is greater than or equal to a first threshold, the load to turn on;
    controlling, if the input voltage is less than or equal to a second threshold, the load to turn off;
    skipping processing if the input voltage is less than the first threshold and is greater than the second threshold; and
    after the controlling a load to perform a corresponding operation, the method further includes:
    adjusting the level of the output voltage.

14. The imaging device according to claim 13, wherein the load comprises an infrared lamp.

15. The imaging device according to claim 10, wherein the controlling, based on a level of the output voltage, a load according to the input voltage to perform a corresponding operation further comprises:
    determining a magnitude of the input voltage if the output voltage is at a high level; and
    configuring a parameter of the load according to the light intensity value if the input voltage is less than or equal to a third threshold; and
    after the controlling a load to perform a corresponding operation, the method further includes:
    adjusting the level of the output voltage.

16. The imaging device according to claim 15, wherein the load comprises an image sensor.

* * * * *

UNITED STATES PATENT AND TRADEMARK OFFICE
CERTIFICATE OF CORRECTION

PATENT NO. : 11,290,653 B1
APPLICATION NO. : 17/469923
DATED : March 29, 2022
INVENTOR(S) : Lei Tang et al.

It is certified that error appears in the above-identified patent and that said Letters Patent is hereby corrected as shown below:

On the Title Page

In the Foreign Application Priority Data section, please add:
"May 19, 2021 (CN) -- 202110550251.7"

Signed and Sealed this
Fourteenth Day of February, 2023

Katherine Kelly Vidal
*Director of the United States Patent and Trademark Office*